United States Patent
Chan et al.

(10) Patent No.: US 10,141,779 B2
(45) Date of Patent: Nov. 27, 2018

(54) UNINTERRUPTIBLE ELECTRIC POWER SYSTEM

(71) Applicant: CLOUD NETWORK TECHNOLOGY SINGAPORE PTE. LTD., Singapore (SG)

(72) Inventors: Hung-Chou Chan, New Taipei (TW); Chao-Ke Wei, New Taipei (TW); Ching-Tang Liu, New Taipei (TW); Yao-Ching Yin, New Taipei (TW)

(73) Assignee: Cloud Network Technology Singapore Pte. Ltd., Singapore (SG)

( * ) Notice: Subject to any disclaimer, the term of this patent is extended or adjusted under 35 U.S.C. 154(b) by 302 days.

(21) Appl. No.: 14/969,714

(22) Filed: Dec. 15, 2015

(65) Prior Publication Data

US 2017/0126056 A1 May 4, 2017

(30) Foreign Application Priority Data

Oct. 29, 2015 (CN) .......................... 2015 1 0715092

(51) Int. Cl.
| | |
|---|---|
| H02J 7/00 | (2006.01) |
| H02J 9/00 | (2006.01) |
| H02J 9/06 | (2006.01) |
| H02M 7/42 | (2006.01) |
| H02M 7/02 | (2006.01) |

(52) U.S. Cl.
CPC ............. *H02J 9/066* (2013.01); *H02J 7/007* (2013.01); *H02M 7/02* (2013.01); *H02M 7/42* (2013.01)

(58) Field of Classification Search
CPC ............ H02J 9/066; H02J 7/007; H02M 7/02; H02M 7/42

USPC .......................................................... 307/67
See application file for complete search history.

(56) References Cited

U.S. PATENT DOCUMENTS

| | | |
|---|---|---|
| 5,638,244 A | 6/1997 | Mekanik et al. |
| 9,081,568 B1 | 7/2015 | Ross et al. |
| 2005/0116547 A1 | 6/2005 | Lin et al. |
| 2006/0220462 A1 | 10/2006 | O'Leary |
| 2006/0226706 A1 | 10/2006 | Edelen et al. |
| 2008/0278003 A1 | 11/2008 | Pouchet et al. |
| 2009/0072623 A1 | 3/2009 | Liao |
| 2012/0119581 A1 | 5/2012 | Silberbauer et al. |

FOREIGN PATENT DOCUMENTS

CN 102916483 2/2013

*Primary Examiner* — Richard Tan
(74) *Attorney, Agent, or Firm* — ScienBiziP, P.C.

(57) ABSTRACT

An uninterruptible electric power system comprises a main power supply unit, an uninterruptible power supply unit receiving AC commercial power from the main power supply unit, and a slave power supply unit. The uninterruptible power supply unit converts the AC commercial power to stable AC power. The slave power supply unit is connected to the uninterruptible power supply unit. The slave power supply unit comprises a slave static transfer switch, which comprises a first input terminal connected to the uninterruptible power supply unit to receive the stable AC power, a second input terminal receiving the AC commercial power, and an output terminal configured to connect, when the uninterruptible power supply unit is in normal operation, to the first input terminal to receive the stable AC power, and connect, when the uninterruptible power supply unit operates abnormally, to the second input terminal to receive the AC commercial power.

18 Claims, 3 Drawing Sheets

UNINTERRUPTIBLE ELECTRIC POWER SYSTEM

CROSS-REFERENCE TO RELATED APPLICATIONS

This application claims priority to Chinese Patent Application No. 201510715092.6 filed on Oct. 29, 2015, the contents of which are incorporated by reference herein.

FIELD

The subject matter herein generally relates to an electric power supply system and in particular to an uninterruptible electric power system.

BACKGROUND

Commercial alternating current (AC) is often used as a primary power source to power communication and data processing equipment which utilize stored program controls and solid-state integrated circuit technology. These circuits are generally very sensitive to any variations of the input power signal from its desired standard waveform. Commercial AC power waveforms are subject to many variations from the standard waveform due to the demands of other users on the power line and other extraneous factors. Undesirable power signal variations causing problems include overvoltage and under-voltage conditions, signal outages, and transient signals such as voltage spikes. These power signal variations may alter the stored data or switch signals and in extreme cases may damage the solid-state circuitry.

BRIEF DESCRIPTION OF THE DRAWINGS

Implementations of the present technology will now be described, by way of example only, with reference to the attached figures.

DETAILED DESCRIPTION

Figure 1:
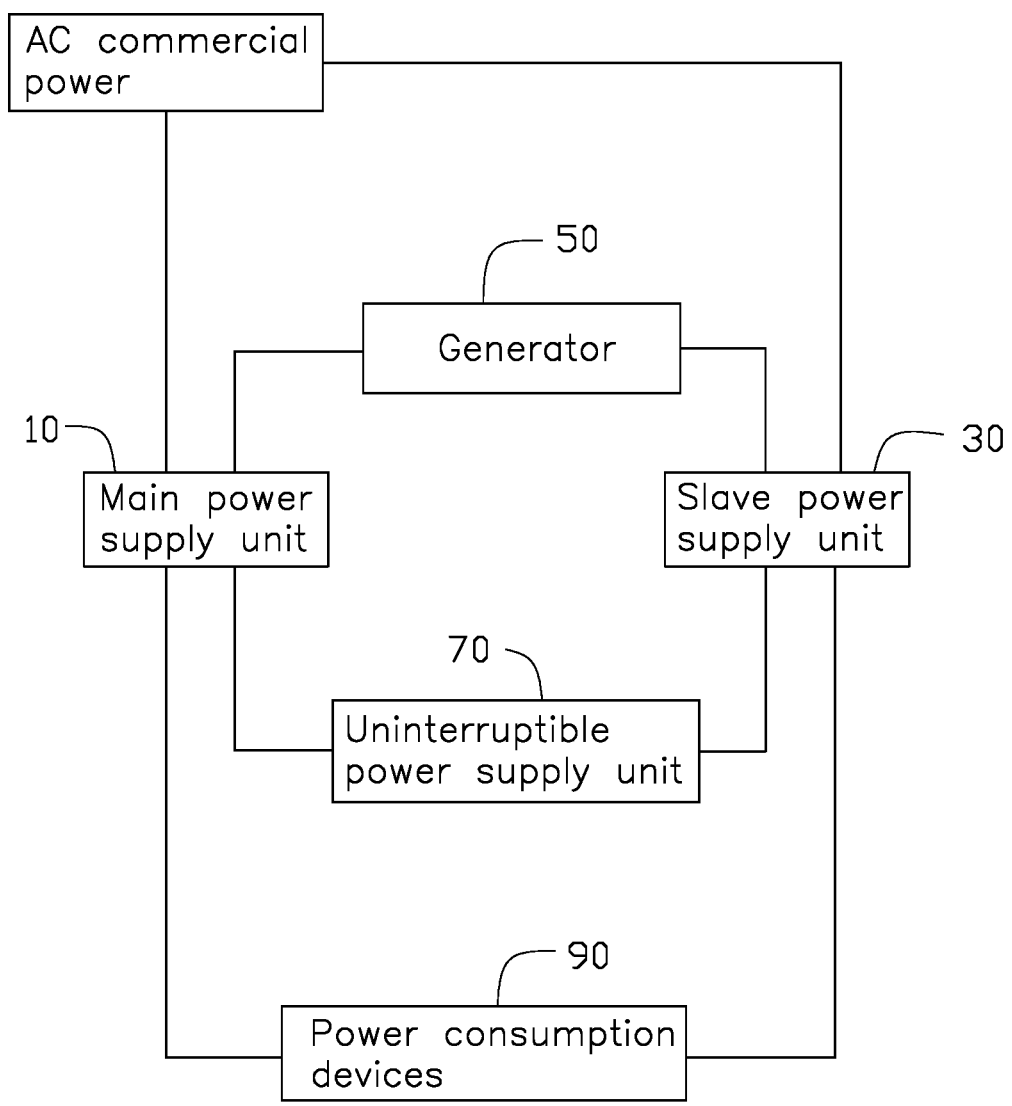
FIG. 1 is a block view of one uninterruptible electric power system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series and the like.

FIG. 1 illustrates an uninterruptible electric power system for providing power to power consumption devices 90. The uninterruptible electric power system comprises a main power supply unit 10, a slave power supply unit 30, a generator 50, and an uninterruptible power supply unit 70.

Figure 2:
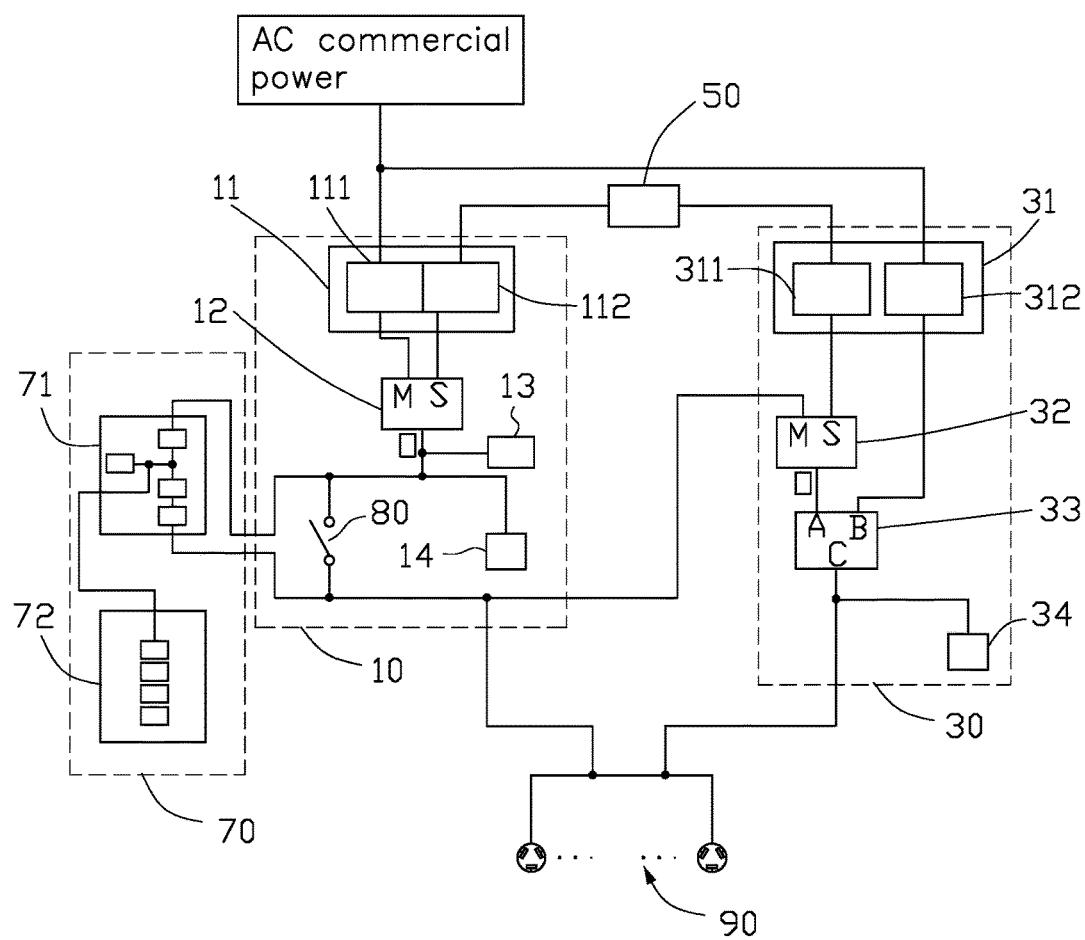
FIG. 2 is a circuit diagram of the uninterruptible electric power system of FIG. 1.

FIG. 2 illustrates that the main power supply unit 10 comprises a first junction box 11, a first automatic transfer switch 12, a power meter 13, and a first surge protective device 14. The first automatic transfer switch 12 comprises a main input terminal M, a slave input terminal S, and a carryout terminal O. In the first automatic transfer switch 12, when both the main input terminal M and the slave input terminal S receive input power, the carryout terminal O is coupled to the main input terminal M and outputs the input power from the main input terminal M. When the main input terminal M does not receive input power and the slave input terminal S receives input power, the carryout terminal O is coupled to the slave input terminal S and outputs the input power from the slave input terminal S.

The first junction box 11 comprises a first air break switch 111 and a second air break switch 112. The first air break switch 111 couples AC commercial power to the main input terminal M of the first automatic transfer switch 12. The second air break switch 112 couples the generator 50 to the slave input terminal S of the first automatic transfer switch 12. The power meter 13 is coupled to the carryout terminal O of the first automatic transfer switch 12 to measure an output voltage and an output current on the carryout terminal O. The first surge protective device 14 is coupled to the carryout terminal O to protect the main power supply unit 10 when an output voltage or current on the carryout terminal O surges.

Figure 3:
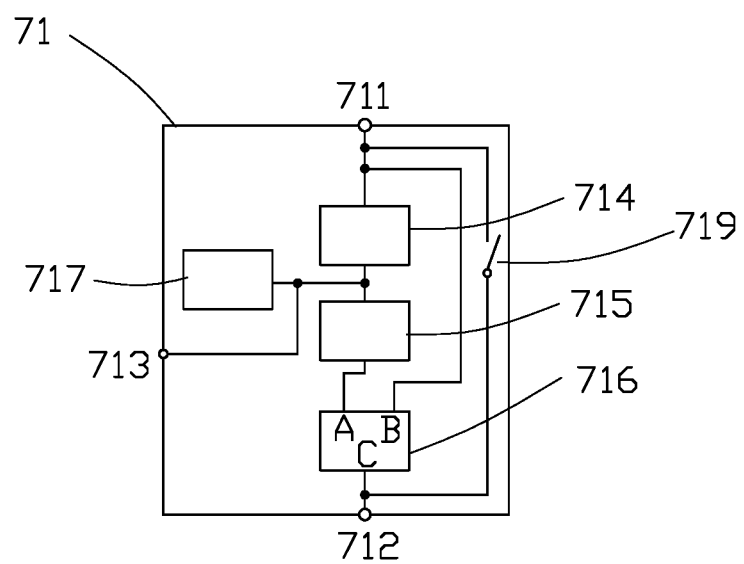
FIG. 3 is a circuit diagram of a power supply module of the uninterruptible electric power system of FIG. 1.

FIGS. 2 and 3 illustrates that the uninterruptible power supply unit 70 comprises a power supply module 71 and a battery group module 72. The power supply module 71 has an input end 711, an output end 712, and a battery connection end 713. The power supply module 71 comprises a rectifying charging module 714, a direct current (DC) to alternating current (AC) inverter 715, a power supply static transfer switch 716, and a battery 717. The battery 717 powers the rectifying charging module 714, the inverter 715, and the power supply static transfer switch 716. The rectifying charging module 714 converts AC power to DC power. The inverter 715 converts DC power to stable AC power. The power supply static transfer switch 716 comprises a first input terminal A, a second input terminal B, and an output terminal C. When the uninterruptible power supply unit 70 works normally and the first input terminal A receives an input power, the output terminal C is coupled to the first input terminal A and outputs the input power of the first input terminal A. A switching time of the power supply static transfer switch 716 is very short, about four milliseconds.

The input end 711 is coupled to the rectifying charging module 714. The inverter 715 outputs AC power to the first input terminal A of the power supply static transfer switch 716. The input end 711 is directly coupled to the second input terminal B of the power supply static transfer switch 716. The output terminal C of the power supply static transfer switch 716 is coupled to the output end 712. The battery connection end 713 of the power supply module 71 couples the rectifying charging module 714 to the battery group module 72 to charge the battery group module 72.

The uninterruptible power supply unit 70 further comprises a repair switch 719 which is coupled between the input end 711 and the output end 712. The repair switch 719 is turned on to cutoff the rectifying charging module 714, the inverter 715, the power supply static transfer switch 716, and the battery 717. Therefore, the rectifying charging module 714, the inverter 715, the power supply static transfer switch 716, and the battery 717 can be maintained. A main repair switch 80 is connected between the carryout terminal O of the first automatic transfer switch 12 and power consumption devices 90. When the uninterruptible power supply unit 70 needs to be repaired or replaced, the main repair switch 80 is turned on to cut off the uninterruptible power supply unit 70 and provide power to the power consumption devices 90 directly.

In one embodiment, the uninterruptible power supply unit 70 comprises a plurality of backup modules. When one or more of the rectifying charging module 714, the inverter 715, the power supply static transfer switch 716 and the battery 717 is broken down, the backup modules works to ensure the uninterruptible power supply unit 70 to work normally. In another embodiment, there are two or more uninterruptible power supply units 70. When one uninterruptible power supply unit 70 is broken down, another uninterruptible power supply unit 70 works normally to provide power.

FIG. 3 illustrates that the output end 712 of the power supply module 71 is coupled to the power consumption devices 90. In one embodiment, the power consumption devices 90 are communication and data processing equipment, or a cooling system for a server, and so on.

The output end 712 of the power supply module 71 is further coupled to the slave power supply unit 30. The slave power supply unit 30 comprises a second junction box 31, a second automatic transfer switch 32, and a slave static transfer switch 33. The second automatic transfer switch 32 is same as the first automatic transfer switch 12. The slave static transfer switch 33 is same as the power supply static transfer switch 716. The slave static transfer switch 33 comprises a first input terminal A, a second input terminal B, and an output terminal C. When both of the first input terminal A and the second input terminal B receive input power, the output terminal C is coupled to the first input terminal A and outputs the input power from the first input terminal A. When the first input terminal A does not receive an input power and the second input terminal receives an input power, the output terminal C is switched to be coupled to the second input terminal B and outputs the input power from the second input terminal B.

The second junction box 31 comprises a third air break switch 311 and a fourth air break switch 312. The third air break switch 311 couples the generator 50 to a slave input terminal S of the second automatic transfer switch 32. A main input terminal M of the second automatic transfer switch 32 is coupled to the output end 712 of the power supply module 71. A carryout terminal O of the second automatic transfer switch 32 is coupled to a first input terminal A of the slave static transfer switch 33. The fourth air break switch 312 couples AC commercial power to the second input terminal B of the slave static transfer switch 33. A second surge protective device 34 is coupled to output terminal C of the slave static transfer switch 33 to protect the slave power supply unit 30 when an output voltage or current on the output terminal C surges.

When the uninterruptible electric power system operates and the AC commercial power is provided normally, the AC commercial power is transmitted to the input end 711 of the power supply module 71. The rectifying charging module 714 converts AC commercial power to DC power to charge the battery group module 72 and the battery 717. The inverter 715 converts DC power to stable AC power provided to power consumption devices 90 and the slave power supply unit 30. The second automatic transfer switch 32 and the slave static transfer switch 33 of the slave power supply unit 30 also transmits the stable AC power to the power consumption devices 90.

When the AC commercial power is cut off, the battery group module 72 and the battery 717 outputs DC power to the inverter 715. The inverter 715 converts DC power to stable AC power provided to power consumption devices 90 and the slave power supply unit 30. Then, the generator 50 starts to work to output AC power to the input end 711 of the power supply module 71. The rectifying charging module 714 converts AC power to DC power to charge the battery group module 72 and the battery 717, and the battery group module 72 and the battery 717 stop outputting DC power. The inverter 715 converts DC power to stable AC power provided to power consumption devices 90 and the slave power supply unit 30.

When the AC commercial power is provided normally and the ununinterruptible power supply unit 70 breaks down, the AC commercial power cannot be provided to the power consumption devices 90 via the ununinterruptible power supply unit 70. Simultaneously, the output terminal C of the slave static transfer switch 33 is coupled to the second input terminal B to receive the AC commercial power. Therefore, the AC commercial power is provided to the power consumption device 90 via the slave power supply unit. Then, the generator 50 starts to output AC power to the power consumption device 90 via the second automatic transfer switch 32 and the slave static transfer switch 33.

In the above uninterruptible electric power system, when the ununinterruptible power supply unit 70 breaks down, the AC commercial power can be provided to the power consumption devices 90 via the slave static transfer switch 33 of the slave power supply unit 30.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:
1. An uninterruptible electric power system comprising:
a main power supply unit; an uninterruptible power supply unit configured to receive AC commercial power from the main power supply unit and configured to convert the AC commercial power to stable AC power; and
a slave power supply unit connected to the uninterruptible power supply unit configured to receive the stable AC power from the uninterruptible power supply unit, the slave power supply unit comprising a slave static transfer switch, which comprises:
a first input terminal connected to the uninterruptible power supply unit to receive the stable AC power, a second input terminal receiving the AC commercial power, and an output terminal configured to connect, when the uninterruptible power supply unit is in normal operation, to the first input terminal to receive the stable AC power and connect, when the uninterruptible power supply unit operates abnormally, to the second input terminal to receive the AC commercial power;

wherein the slave power supply unit comprises a second automatic transfer switch, the second automatic transfer switch comprises a main input terminal, a slave input terminal, and a carryout terminal, the main input terminal is connected to the uninterruptible power supply unit to receive the stable AC power, the slave input terminal is connected to a generator, the carryout terminal is connected to the first input terminal of the slave static transfer switch.

2. The uninterruptible electric power system of claim 1, wherein the main power supply unit comprises a first automatic transfer switch, the first automatic transfer switch comprises a main input terminal, a slave input terminal, and a carryout terminal, the main input terminal receives the AC commercial power, the salve input terminal is connected to a generator, the carryout terminal is connected to the uninterruptible power supply unit, the carryout terminal is configured to couple to the main input terminal when the AC commercial power is on, and couple to the slave input terminal when the AC commercial power is off and the generator works.

3. The uninterruptible electric power system of claim 2, wherein a first surge protective device is coupled to the carryout terminal of the first automatic transfer switch to protect the main power supply unit when an output voltage or current on the carryout terminal surges.

4. The uninterruptible electric power system of claim 2, wherein a power meter is coupled to the carryout terminal of the first automatic transfer switch to measure an output voltage or an output current on the carryout terminal.

5. The uninterruptible electric power system of claim 1, wherein the uninterruptible power supply unit comprises a power supply module, the power supply module comprises a rectifying charging module and a direct current (DC) to alternating current (AC) inverter, the rectifying charging module converts the AC commercial power to DC power, and the DC to AC inverter converts the DC power to the stable AC power.

6. The uninterruptible electric power system of claim 5, wherein the uninterruptible power supply unit comprises a battery group module, the battery group module is charged by the DC power, and the battery group module is configured to provide DC power to the DC to AC inverter when the AC commercial power is off.

7. The uninterruptible electric power system of claim 5, wherein the uninterruptible power supply unit comprises a battery, and the battery powers the DC to AC inverter.

8. The uninterruptible electric power system of claim 1, wherein the carryout terminal is configured to couple to the main input terminal when the main input terminal receives the stable AC power, and couple to the slave input terminal when the main input terminal does not receive the stable AC power and the generator works.

9. The uninterruptible electric power system of claim 8, wherein a second surge protective device is coupled to the carryout terminal of the second automatic transfer switch to protect the slave power supply unit when an output voltage or current on the carryout terminal surges.

10. An uninterruptible electric power system, comprising:
an uninterruptible power supply unit comprising a power supply module and a battery group module, the power supply module comprising an input end, an output end, and a battery connection end, the input end configured to receive AC commercial power, the power supply module configured to convert the AC commercial power to stable AC power; and a slave power supply unit comprising a slave static transfer switch, the slave static transfer switch comprising a first input terminal, a second input terminal, and an output terminal, the first input terminal connected to the output end of the uninterruptible power supply unit to receive the stable AC power, the second input terminal receiving the AC commercial power, the output terminal configured to connect to the first input terminal to receive the stable AC power when the uninterruptible power supply unit works normally, and connect to the second input terminal to receive the AC commercial power when the uninterruptible power supply unit works abnormally;

wherein the slave power supply unit comprises a second automatic transfer switch, the second automatic transfer switch comprises a main input terminal, a slave input terminal, and a carryout terminal, the main input terminal is connected to the uninterruptible power supply unit to receive the stable AC power, the slave input terminal is connected to a generator; the carryout terminal is connected to the first input terminal of the slave static transfer switch.

11. The uninterruptible electric power system of claim 10, further comprising a main power supply unit, wherein the main power supply unit comprises a first automatic transfer switch, the first automatic transfer switch comprises a main input terminal, a slave input terminal, and a carryout terminal coupled to the input end of the uninterruptible power supply unit, the main input terminal receives the AC commercial power, the salve input terminal is connected to a generator, the carryout terminal is connected to the uninterruptible power supply unit, the carryout terminal is configured to couple to the main input terminal when the AC commercial power is on, and couple to the slave input terminal when the AC commercial power is off and the generator works.

12. The uninterruptible electric power system of claim 11, wherein a first surge protective device is coupled to the carryout terminal of the first automatic transfer switch to protect the main power supply unit when an output voltage or current on the carryout terminal surges.

13. The uninterruptible electric power system of claim 11, wherein a power meter is coupled to the carryout terminal of the first automatic transfer switch to measure an output voltage or an output current on the carryout terminal.

14. The uninterruptible electric power system of claim 10, wherein the uninterruptible power supply unit comprises a power supply module, the power supply module comprises a rectifying charging module and a direct current (DC) to alternating current (AC) inverter, the rectifying charging module converts the AC commercial power to DC power, and the DC to AC inverter converts the DC power to the stable AC power.

15. The uninterruptible electric power system of claim 14, wherein the uninterruptible power supply unit comprises a battery group module, the battery group module is charged by the DC power, and the battery group module is configured to provide DC power to the DC to AC inverter when the AC commercial power is off.

16. The uninterruptible electric power system of claim 14, wherein the uninterruptible power supply unit comprises a battery, and the battery powers the DC to AC inverter.

17. The uninterruptible electric power system of claim 10, wherein the carryout terminal is configured to couple to the main input terminal when the main input terminal receives the stable AC power, and couple to the slave input terminal when the main input terminal does not receive the stable AC power and the generator works.

18. The uninterruptible electric power system of claim 17, wherein a second surge protective device is coupled to the carryout terminal of the second automatic transfer switch to protect the slave power supply unit when an output voltage or current on the carryout terminal surges.

\* \* \* \* \*